United States Patent [19]

Speer

[11] 4,283,240
[45] Aug. 11, 1981

[54] METHOD FOR REPAIRING GRAINED OR EMBOSSED VINYL SHEETING WITH IMPRINTED VINYL MOLDS

[76] Inventor: Lawrence L. Speer, 7177 State Rd., Wadsworth, Ohio 44281

[21] Appl. No.: 133,455

[22] Filed: Mar. 24, 1980

[51] Int. Cl.³ .............................................. B29D 9/00
[52] U.S. Cl. ......................................... 156/98; 264/36; 264/225; 264/293; 264/322
[58] Field of Search ................ 264/36, 225, 293, 322; 156/98

[56] References Cited

U.S. PATENT DOCUMENTS

| | | | |
|---|---|---|---|
| 3,713,926 | 1/1973 | Speer | 156/98 |
| 3,887,413 | 6/1975 | Speer | 264/36 X |
| 4,028,160 | 6/1977 | Golumbic | 264/36 X |
| 4,055,613 | 10/1977 | Kapral | 264/225 X |

*Primary Examiner*—Thomas P. Pavelko
*Attorney, Agent, or Firm*—Wilson, Fraser, Barker & Clemens

[57] ABSTRACT

A method for repairing grained or embossed vinyl sheeting with imprinted vinyl molds is provided, whereby the repaired area is grained or embossed in the original pattern without the application of pressure, thereby eliminating depression or deformation in the repaired vinyl sheeting.

9 Claims, 3 Drawing Figures

METHOD FOR REPAIRING GRAINED OR EMBOSSED VINYL SHEETING WITH IMPRINTED VINYL MOLDS

BACKGROUND OF THE INVENTION

The invention relates to a method of repairing textured, grained or embossed vinyl sheeting, in situ, or in a shop, to restore torn or damaged areas of the vinyl sheeting with its original pattern without producing a deformation or depression in the repaired area.

More specifically this invention relates to a method for repairing textured vinyl sheeting, by employing an imprinted vinyl mold having the same pattern as the textured vinyl to be repaired, so that the mold may be placed, without pressure, onto heated vinyl repair compound previously placed in the damaged area, to form the pattern therein without producing depressions or deformations in the repaired area.

Because of the nature of vinyl sheeting, tears and rips occur to produce damaged areas. In order to repair damaged areas of vinyl sheeting, a vinyl compound, such as a plastisol, is generally applied to the damaged area and a hot iron is pressed over a grained plate in contact with the compound, or a heat gun is used to give flow characteristics to the vinyl compound and a grained plate is pressed thereover, to facilitate obtaining a grain or texture or embossment in the repair area.

The pressure applied onto the grained plate produces a grained surface in the repair area, however it is not without its problems. Deformation and depression in the repair area is common from the applied pressure, which remains as a permanent feature in the repair area. To overcome this problem, attempts have been made to use a large flat iron to mask the depression. However, other problems arose including distortion to the surrounding areas of the repair and/or destruction of the grained areas. Protective paste has been used on areas surrounding the repair area to aid in maintaining the original grain. This is beneficial, but it does not answer the problem of deformations resulting from applied pressure to obtain the grain in the repair area. Still other attempts to obtain grained effects with vinyl repair include employing release agents to the grained plate or employing vinyl release paper, so that the plate or paper did not adversely stick to the repair area. These attempts also produce problems, one of which is the incomplete adherence of the grained surface to the hot vinyl compound without the application of pressure, and hence a poor looking repair results.

SUMMARY OF THE INVENTION

The present invention employs a vinyl mold or matrix which has been imprinted with the desired pattern of the vinyl sheeting to be repaired. The vinyl mold is placed on hot vinyl compound within the confines of the repair area and it removably adheres to the hot vinyl compound without having to apply pressure. When the hot vinyl compound has cooled to approximately room temperature, the vinyl mold is easily stripped from the repair area and no depressions or deformations are present. One advantage then of the present invention is that a textured vinyl mold is formed and is removably adhered to hot vinyl compound in the repair area, without pressure being applied, thereby eliminating deformations and depressions, which heretofore have been so common when repairing vinyl sheeting.

One feature of the present invention is the use of vinyl molds imprinted with the patterns of the vinyl sheetings to be repaired.

Another feature of the present invention is that the imprinted vinyl mold is easily positioned onto the hot vinyl compound within the repair area, and that it removable adheres to the hot vinyl compound without application of pressure, thus eliminating deformation and depression in the repair area.

DESCRIPTION OF THE PREFERRED EMBODIMENT

Figure 1:
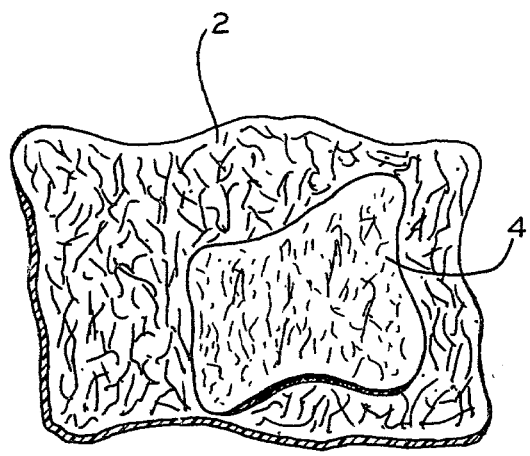
FIG. 1 is a perspective view of a surface having the grained or embossed characteristics of the vinyl sheeting to be repaired, with a portion of the surface being covered with a vinyl swatch for purposes of obtaining an imprint therefrom.

The method of this invention finds particular utility in the repair of textured vinyl sheeting materials, in situ, and/or in repair shops. This method is an improvement over repair methods disclosed in U.S. Pat. Nos. 3,713,926 and 3,887,413. Such methods for repairing vinyl sheeting comprise the use of film forming compounds in the repair area and the application of heat from a hot iron or from another source such as a heat gun. To effect a grained surface in the repair area a grained plate or vinyl release paper has been used under the hot iron or over pre-heated vinyl compound and pressure has been applied to obtain the grained effect. The applied pressure causes deformations in the repair area which are unattractive. Therefore, it becomes crucial that the repair operation be accomplished without any significant distortion within the repair area or the immediate surrounding area, despite the fact that a textured surface must be employed to match the texture of the vinyl sheet to be repaired.

In practicing the invention, a vinyl mold is first prepared to obtain an imprint of the desired pattern or texture of the vinyl sheeting to be repaired. One method of obtaining an imprint on a vinyl mold is to heat a swatch of vinyl material of requisite size for the repair area, to its softening point to apply the same, under pressure, to a grained or textured surface such as a grained or textured plate or even the vinyl sheeting to be repaired. This allows the vinyl material to be imprinted with the desired grain or texture and thus form a usuable mold. The swatch must be of suitable thickness (about $\frac{1}{8}-\frac{1}{4}$ inches) to be imprinted after it is heated. And, it has been found that foamed vinyl is better adapted than unfoamed vinyl for imprinting purposes, perhaps because the former is thicker than the latter, and perhaps due to the air cells therein. Another method with which to form an imprinted vinyl mold or matrix comprises employing a metal plate having the specific grained or textured pattern, spreading a vinyl plastisol paste, at a sufficient thickness to be able to be imprinted, with a spatula or other suitable means, applying sufficient heat to cause the paste to form air bubbles or to smoke, which causes the paste to flow and form a film, and to insure initiation of polymerization, applying pressure to the heated film with the spatula or other suitable press means, sufficient to obtain an imprint, cooling the film, in situ, removing the pressure and removing the imprinted vinyl film. Upon initiating polymerization, a film is generated, which film is imprinted. The cooling of the film is generally to about room temperature. The thickness of the paste on the metal plate is generally about ⅛–¼ inches prior to heating, in order to obtain an imprinted film about 1/16–3/16 inches in thickness subsequent to heating, pressing and cooling.

The size of the vinyl mold is generally larger than the repair area to insure overlap of the former with the latter, during the repair operation.

Figure 2:
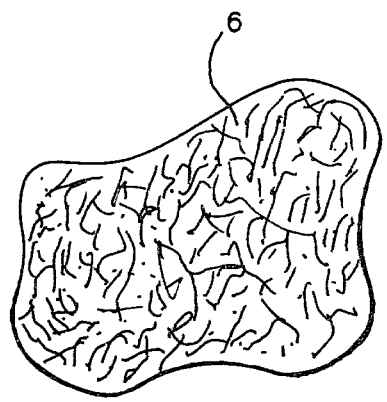
FIG. 2 is a plan view of the imprinted vinyl mold.

Referring to FIG. 1, a grained surface 2, such as a metal plate, metallic foil or an undamaged area of the vinyl sheeting to be repaired, is shown partially covered by a swatch of expanded vinyl material 4, whereby under the application of pressure to the expanded vinyl material which has been previously heated to its softening temperature, an imprinted mold 6 will be produced, such as shown in FIG. 2.

It is well known that vinyl materials and other thermo plastic materials are easily deformable when subjected to temperatures at or near their softening point and an imprint can be made therein from a desired pattern. However, it has been found that when the vinyl material is used to form an imprinted mold, the imprint on the mold is easily transferred to a hot vinyl compound without the application of pressure. That is, by the mere application or placing of the imprinted mold onto previously heated vinyl compound such as is used in a repair area of vinyl sheeting, the imprinted vinyl mold releasably adheres to the hot vinyl compound and the latter readily accepts the imprint of the mold without destroying the imprint on the mold and without pressure having been applied. Upon cooling of the hot vinyl compound in the repair area, the imprinted vinyl mold is easily stripped from the repair area. The pattern in the repaired area matches the pattern of the vinyl sheeting, such that it is difficult to detect the repaired area from other undamaged areas of the vinyl sheeting.

Figure 3:
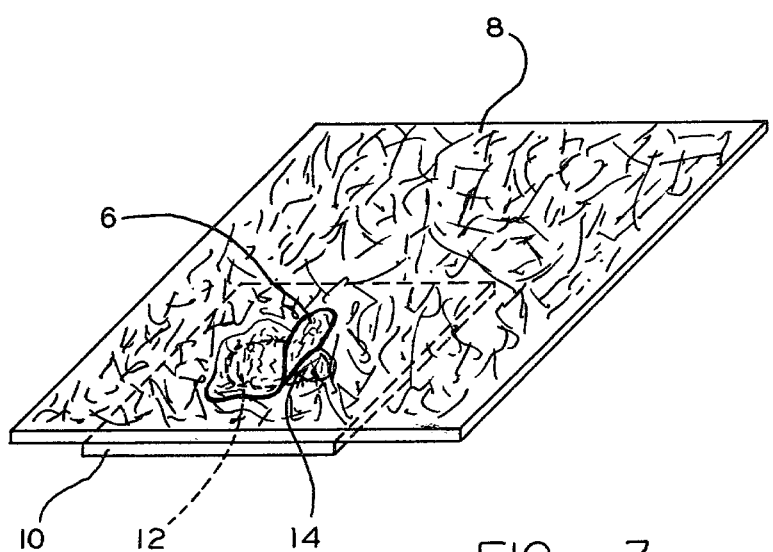
FIG. 3 is a perspective view of the imprinted vinyl mold partially in contact with the vinyl compound in the repair area upon removal of the vinyl mold, thus unveiling the restored area.

Referring to FIG. 3 grained vinyl sheeting 8 is shown with an adhesive backing material 10 disposed about a repair area 12 to form a confined cavity for application of a vinyl compound 14 therein. The imprinted vinyl mold 6 is shown partially removed from the repair area, and the imprint or pattern is in the repair area without any depressions or deformations being present.

The preferred method for repairing a damaged area of grained vinyl sheeting comprises the sequential steps of forming an imprinted vinyl mold of the grained or textured vinyl sheeting to be repaired, trimming the edges of the damaged area of the vinyl sheeting, disposing an adhesive backing under the damaged area to form a cavity, filling the cavity with a vinyl repair compound, heating the vinyl repair compound, in situ, with a heat gun until the compound is sufficiently soft to accept an imprint but insufficiently soft to cause permanent bonding with the vinyl mold or to cause loss of the imprint on the vinyl mold, placing the imprinted vinyl mold in contact with the soft vinyl compound without pressure so that the mold removably adheres to the compound and the compound accepts the grain of the mold, allowing the soft compound to cool to approximately room temperature while in contact with the vinyl mold, and stripping the vinyl mold from the repair area. The presence of the imprinted vinyl mold not only contributes to the pattern in the repair area but apparently also helps to evenly distribute the hot vinyl repair compound in the cavity so that an esthetically appealing repair is obtained. Additionally, it is optional to remove the adhesive backing from the repair area after stripping the mold therefrom.

The vinyl material used in fabricating the imprinted vinyl mold may be any foamed or unfoamed vinyl material, of suitable thickness, so that when it is heated to its softening point and is pressed upon the grained or textured surface to be imprinted, the definition of the imprint is uniformly of high quality. In a like manner, the vinyl mold may be produced by spreading a typical vinyl plastisol paste with a spatula over the surface to be imprinted, heating the paste, in situ, until it begins to smoke and/or air bubbles form therein (approximately 400° F.), applying pressure to the heated paste with the spatula sufficient to obtain the imprint, cooling the paste, eg. with cool air or with a cold plate, removing the spatula, and removing the imprinted vinyl mold. The vinyl mold appears to be foamed due to the presence of air bubbles therein.

The hot vinyl compound used in the repair area is typical of that used in the art, comprising for example, a mixture of polyvinyl acetate or polyvinyl chloride, with a plasticizer, such as diethylhexyl phthalate or dioctyl phthalate. The vinyl compound is typically applied as a paste to the repair area and is heated with a heating means such as a heat gun so that no pressure is applied to the repair area or its surrounding area. By maintaining the heat sink of the hot vinyl compound in the repair area to a temperature range which sufficiently softens the compound to accept an imprint from the vinyl mold, but which insufficiently softens the compound to cause permanent bonding with the imprinted vinyl mold or to cause loss of the imprint of the vinyl mold, the vinyl mold adheres to the hot vinyl compound without the application of pressure, and thus produces a repair surface without any distortions.

It appears that the mere placing of the imprinted vinyl mold onto the heated vinyl repair compound establishes an intimate relationship between the mold and the compound, that is, by a physical attraction. This physical attraction by the hot vinyl repair compound appears to draw the imprinted vinyl mold thereto, thus insuring a good transfer of the imprint to the vinyl repair compound without the application of pressure on the mold. The net result is the elimination of distortions in the repair area and/or contiguous area, of the vinyl sheeting.

The temperature ranges for the heating of the repair compound generally ranges from about 300°–500° F., but preferably ranges from about 350°–450° F. This temperature could distort and ruin the mold, but some cooling takes place upon removal of the heating means and prior to applying the mold to the heated repair compound.

The vinyl plastisol paste for use in preparing a mold and for use as a repair compound comprises the following proportions of ingredients, which may vary depending upon the condition and character of the vinyl sheeting to be repaired. The main requirement is that the compound be capable of forming a film upon heating and cooling, so that it may receive an imprint. The formulations of the vinyl plastisol pastes for the mold and the repair compound do not have to be the same for a specific repair operation, but simplicity usually dictates that they are the same due to the availability of the paste for either operation. Previously prepared molds may be used however, with repair compounds of differing composition.

The broad range of ingredients for the repair compound and for the preparation of the mold or matrix comprises:

| Ingredients | Percent by Volume |
| --- | --- |
| vinyl resin (powder) | 50–80 |
| plasticizer (liquid) | 20–50 |

The preferred range of ingredients for the repair compound and for the preparation of the mold or matrix comprises:

| Ingredients | Percent by Volume |
| --- | --- |
| vinyl resin (powder) | 55–75 |
| plasticizer (liquid) | 25–45 |

Specific formulations utilized in the repair of textured vinyl sheeting are shown in the following examples.

EXAMPLE I

| Ingredients | Percent by Volume |
| --- | --- |
| Polyvinyl Acetate | 60.0 |
| Diethylhexyl Phthalate | 40.0 |

EXAMPLE II

| Ingredients | Percent by Volume |
| --- | --- |
| Polyvinyl Chloride | 70.0 |
| Dioctyl Phthalate | 30.0 |

Specific formulations and materials utilized in the preparation of a vinyl mold or matrix are shown in the following examples.

EXAMPLE III

| Ingredients | Percent by Volume |
| --- | --- |
| Polyvinyl Acetate | 65.0 |
| Diethylhexyl Phthalate | 35.0 |

EXAMPLE IV

| Ingredients | Percent by Volume |
| --- | --- |
| Polyvinyl Chloride | 55.0 |
| Dioctyl Phthalate | 45.0 |

The ingredients of Examples III and IV were mixed separately, to obtain separate pastes. Each paste was spread at a thickness of about ⅛–¼ inches onto a metal plate having textured characteristics of the vinyl sheet to be repaired. The pastes were heated, in situ, to a point where air bubbles and smoke appeared, to insure that polymerization of the paste was initiated, and that a film would be produced. Pressure was applied to each heated mass via a flat surface such as a block or spatula, sufficient to obtain an imprint in the resulting films. Each heated mass was allowed to cool, in situ, to about room temperature, the pressure was removed, and the imprinted films were lifted from the metal plate.

EXAMPLE V

A mold or matrix was prepared by utilizing a swatch of foamed polyvinyl chloride having a thickness of about 3/16 inches, and heating the same until its softening point was reached, sufficient to accept an imprint under pressure. The heated, softened swatch was placed onto an undamaged area of the textured vinyl sheet to be repaired. Pressure was applied via a block to the softened swatch, sufficiently to obtain an imprint. The swatch was allowed to cool to about room temperature so that the imprint remained dimensionally stable. The block was removed, and the imprinted mold was lifted from the surface, exhibiting excellent reproductive characteristics of the textured surface.

The ingredients of Examples I & II were separately compounded to form separate pastes. The paste of Example I was applied to a preformed cavity in textured vinyl sheeting, and the paste of Example II was applied to another preformed cavity in the textured vinyl sheeting. A heat gun was used to heat the paste of Example I in the cavity, to about 400° F. Upon removal of the heat gun, the vinyl mold of Example III was placed, without pressure, onto the heated compound and the contiguous area. Upon cooling to about room temperature a film developed, imprinted with the desired texture of the vinyl sheeting. The net result was a repair which was aesthetically appealing and firmly bonded to the edges of the vinyl sheeting, without the presence of distortions.

Upon stripping or removing the mold from the cooled compound of Example I, some temporary distortion of the mold was noted, but soon thereafter it restored itself to its original configuration.

The same procedure was used on the paste of Example II, using the same mold, and the net result was the same.

When colored vinyl sheeting is to be repaired, coloring agent is added to the formulations to match the vinyl sheeting.

Modifications of the disclosed method may be resorted to without departing from the spirit and scope of the appended claims.

What I claim is:

1. A method for repairing a damaged area of grained or embossed vinyl sheeting comprising the sequential steps of:
    (a) forming an imprinted vinyl mold or matrix of the grained or embossed vinyl sheeting to be repaired;
    (b) trimming the edges of the damaged area of vinyl sheeting;
    (c) disposing an adhesive backing under the damaged area to form a cavity;
    (d) filling the cavity with a vinyl repair compound;
    (e) heating the vinyl repair compound with a heat source until the compound is sufficiently soft to accept an imprint but insufficiently soft to cause permanent bonding with the vinyl mold or matrix, or to cause loss of the imprint on the vinyl mold;
    (f) placing the relatively cool imprinted vinyl mold in contact with the soft vinyl compound without pressure being applied, so that the mold removably adheres to the compound and the compound accepts the grain of the mold;

(g) allowing the soft compound to cool to about room temperature while in contact with the vinyl mold; and (h) stripping the vinyl mold from the repair area.

2. The method as claimed in claim 1 wherein said vinyl repair compound is heated to 350° to 400° F.

3. The method as claimed in claim 1, further comprising removing the adhesive backing subsequent to stripping the vinyl mold from the repair area.

4. The method as claimed in claim 1, further comprising forming the imprinted vinyl mold or matrix by heating a swatch of vinyl until the vinyl swatch is sufficiently softened to accept an imprint under pressure, said vinyl swatch having sufficient thickness to be able to be imprinted and having sufficient size to be able to excessively cover the repair area, placing the softened vinyl swatch onto a surface having the grained or embossed character of the vinyl to be repaired, pressing the softened vinyl swatch, in situ, onto the surface sufficiently to obtain an imprint, allowing the softened vinyl swatch to cool so that the imprint remains dimensionally stable, and removing the imprinted vinyl mold from the surface.

5. The method as claimed in claim 4, wherein the vinyl swatch is expanded or foamed vinyl.

6. The method as claimed in claim 4, wherein the surface is a metal plate or foil.

7. The method as claimed in claim 1, further comprising forming the imprinted vinyl mold or matrix by spreading a vinyl plastisol paste, at a thickness sufficient to form a film capable of being imprinted, onto a metal plate having the grained or embossed character of the vinyl to be repaired, heating the paste, in situ, until the paste forms a film with air bubbles or begins to smoke, applying pressure to the heated film sufficient to obtain an imprint, cooling the film, in situ, removing the pressure, and removing the imprinted vinyl film.

8. The method as claimed in claim 7, wherein the vinyl plastisol paste and the vinyl repair compound comprise:

| Ingredients | Percent by Volume |
|---|---|
| vinyl resin | 50–80 |
| plasticizer | 20–50 |

9. The method as claimed in claim 8, wherein the vinyl resin is polyvinyl acetate and the plasticizer is diethylhexyl phthalate.

* * * * *